April 6, 1954     A. C. PITMAN     2,674,710
REVERSING CONTROL SYSTEM
Filed April 25, 1950
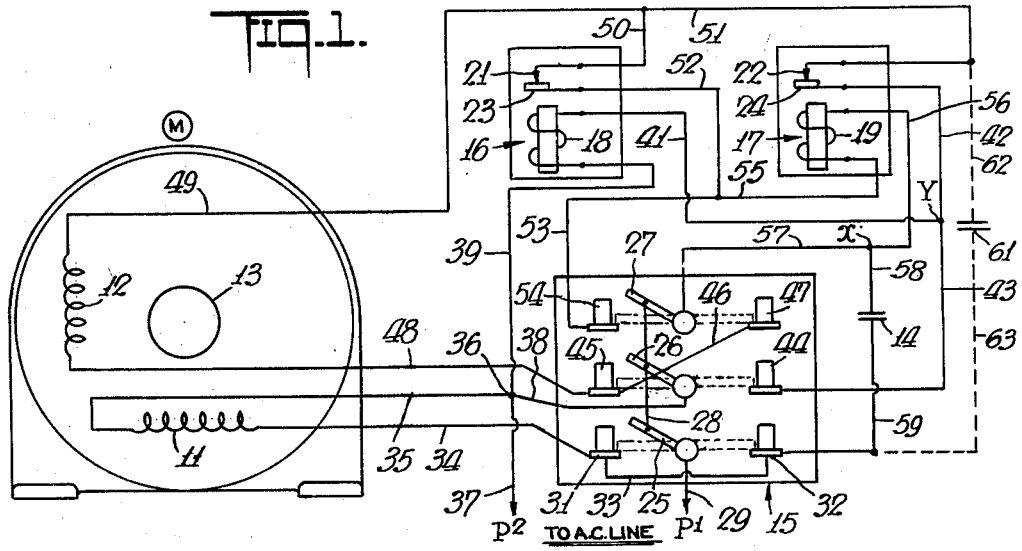
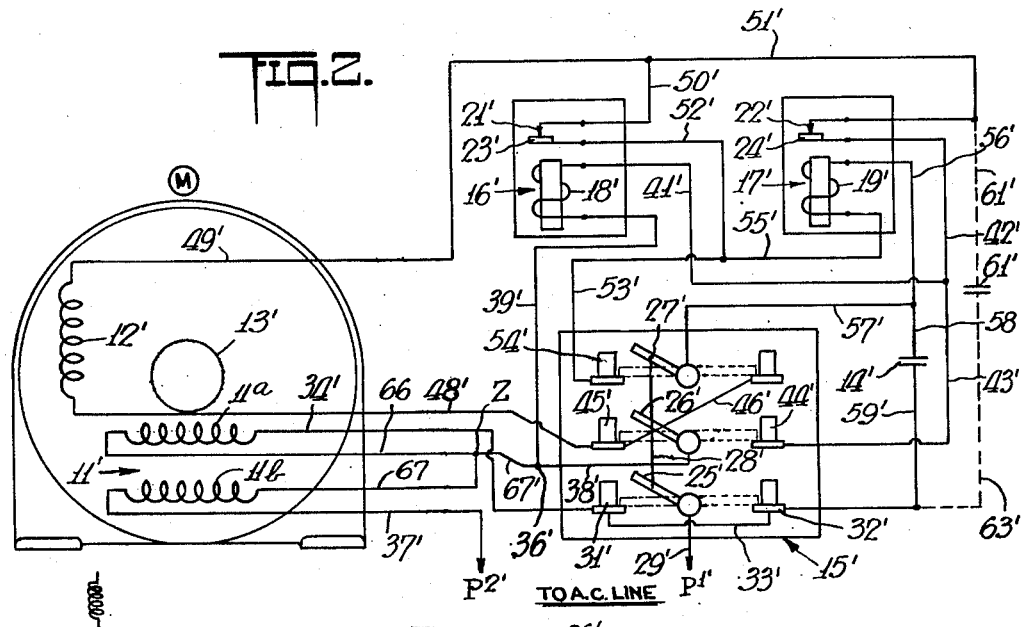
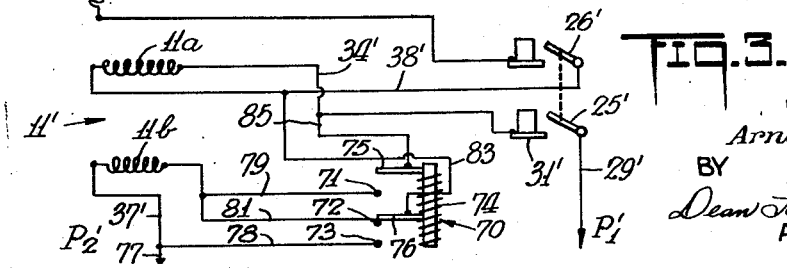
INVENTOR
Arnold C. Pitman
BY
Dean Fairbank & Hirsch
ATTORNEYS Patented Apr. 6, 1954

2,674,710

UNITED STATES PATENT OFFICE 2,674,710

REVERSING CONTROL SYSTEM

Arnold C. Pitman, Stamford, Conn., assignor to Electric Specialty Company, a corporation of Delaware Application April 25, 1950, Serial No. 157,958

4 Claims. (Cl. 318—207)

This invention relates to reversing control systems and more particularly to a reversing control system for a single phase induction motor.

In conventional single phase induction motors, a main or running winding and an auxiliary or starting winding are physically displaced from each other on the stator of the motor and carry currents displaced in phase in order that a rotating magnetic field be created to provide the starting torque required to bring the motor to nearly its synchronous speed, the phase displacement of the currents being produced in one type of induction motor by a capacitor connected in series with the starting winding.

In starting such motor, both windings are initially simultaneously energized from a source of single phase alternating current, and when the motor has accelerated to a sufficiently high speed which is near the synchronous speed thereof, the circuit to the starting winding is interrupted and the motor runs on the main winding alone.

Such interruption of the starting winding may be, for example, by a centrifugal switch actuated by the rotor of the motor and breaking the circuit to the starting winding when such rotor is rotating at a predetermined speed, or by a relay having a coil which may be in parallel with the starting winding and also breaking the circuit to the starting winding when the rotor of the motor is revolving at a predetermined speed.

In order to reverse the direction of rotation of the rotor of the single phase induction motor, it is necessary that the phase relation of the main winding and the starting winding be reversed. Thus, it is apparent that the single phase induction motor cannot be reversed unless the starting winding and running winding are both in circuit in order that such phase reversal may be accomplished.

Where a centrifugal switch is used to interrupt the circuit to the starting winding and it is desired to reverse the direction of rotation of the rotor while it is running at nearly its synchronous speed, it is necessary to disconnect the main winding from the power line so that the rotor will slow down sufficiently to permit the centrifugal switch to close to put the starting winding back into circuit. At such time the starting and main windings can again be connected to the power line with the leads of either of the windings reversed from its original position to create a reverse torque to reverse the direction of rotation of the rotor.

Such arrangement requires a considerable period of time to elapse before the rotor has slowed down sufficiently to permit reclosure of the centrifugal switch and as a result, rapid reversing of the rotor of the motor as by the rapid reversal of the leads of one of the windings, is not possible, for if such reversal of the leads should occur before the starting winding is back in circuit, the rotor will continue rotating in the same direction.

Even where braking means are used to hasten the slowing of the motor, considerable time will elapse and the use of such braking means requires additional mechanical elements which add considerably to the bulk and cost of the motor and also require constant maintenance as does the centrifugal switch used.

The relay type of circuit interrupter for the starting winding has a coil which may be in parallel with the starting winding and which is energized to open its associated contacts to break the circuit to the starting winding when the rotor speed has increased sufficiently to induce a sufficiently high voltage in the starting winding and hence in the relay coil associated therewith to permit operation of such relay. As the starting winding is not connected to the source of current when the motor is running at normal speed, if the leads to the main winding should be reversed, no reverse torque would be developed as both the main and starting windings must be in circuit for this to occur. Hence no reversal of the direction of rotation of the rotor would take place as the alternating current through the main winding would still drive the rotor and the rotor would still induce a voltage in the starting winding and hence in the relay coil associated therewith to maintain the latter energized. Thus the contacts of the relay will remain open so that no current would be applied from the main power line to the starting winding and hence no relative phase reversal between the starting winding and running winding would be effected, which is necessary for the reversal of the motor.

It is accordingly among the objects of the invention to provide a reversing control system for single phase induction motors of the capacitor type, using but few conventional relatively inexpensive parts which are not likely to become out of order and hence require little or no maintenance and by the use of which, upon the closing of a switch, even when the motor is running at nearly synchronous speed, reverse torque may be instantly developed without need for centrifugal switches, brakes or complicated circuits.

Another object of the invention is to provide a single phase induction motor with a reversing control system of the above type which nevertheless, will automatically and without need for opening and closing of the main power line switch, resume synchronous speed in the direction of its rotation upon relief of an overload that has temporarily slowed it down.

Another object is to provide a reversing control system of the above type for single phase induction motors adapted for use with two different input voltages.

According to one aspect of the invention, the reversing control system for the single phase induction motor of the capacitor type, includes a pair of relays each having a pair of normally closed contacts and a coil associated with the starting winding of the motor. Switch means are provided, associated with such relays so that either one or the other of the coils thereof may be put into circuit with such starting winding. Circuit means associated with the switch provide a path from a source of current, through said switch to said main winding, and also from said source of current through said switch and through one or the other of said pairs of normally closed contacts to said starting winding. The switch is so arranged that the phase of the input voltage to the starting winding with respect to the phase of the input voltage to the main winding will be reversed 180° as one or the other of the pair of normally closed contacts is put in circuit with said starting winding to reverse the direction of rotation of the rotor of the motor. Additional circuit means are also provided associated with said switch so that in one position of the latter, when the coil of one of the relays is in circuit with the starting winding, the coil of the other relay will be short-circuited, thereby retaining closed the contacts associated with said short-circuited coil to provide a closed circuit from said first coil to said starting winding. Thus upon attaining by the rotor of said motor of nearly synchronous speed the increased voltage in said starting winding will be transmitted to said coil in circuit therewith to energize said coil, thereby opening the contacts associated therewith to break the circuit.

In a specific application of the invention, the coils of one or the other of the relays may be placed in parallel with the starting winding and the pair of contacts associated with the coil in parallel with said starting winding will be in series with the latter and with the source of current, and the pair of contacts of the other coil will be in series with the first named coil.

According to another aspect of the invention, the main winding of the motor has two sections and switch means are provided in circuit with said sections to connect the latter in series or in parallel as desired.

In the accompanying drawings, in which are shown one or more of various possible embodiments of the several features of the invention, Fig. 1 is a circuit diagram of one embodiment of the control system, Fig. 2 is a view similar to Fig. 1 of another embodiment of the control system, and Fig. 3 is a circuit diagram of the switching arrangement to adapt the main winding for use with two different input voltages.

Referring now to the drawings, in Fig. 1 is diagrammatically shown a single phase induction motor M having a main or running winding 11 and auxiliary or starting winding 12 physically displaced from the main winding, and a rotor 13 driven by said windings. The necessary phase displacement between the currents in the main and starting windings 11 and 12 necessary to produce the rotating field required to revolve the rotor 13, is provided by means of the capacitor 14 which is desirably connected in series with the starting winding 12 during starting of the motor, in the manner hereinafter to be described. As such capacitor type single phase induction motor is conventional in construction, it will not be further described.

The control system for such motor M desirably comprises a conventional double throw, triple pole switch 15 and a pair of conventional relays 16 and 17, each desirably having a coil 18 and 19 respectively, and a fixed contact 21, 22 respectively and a movable contact 23, 24 normally engaging said fixed contacts 21, 22 respectively.

The movable switch arms 25, 26 and 27 of switch 15 are ganged, desirably by an insulating member 28, and switch arm 25 is connected by lead 29 to one side $P_1$ of the source of alternating current, the poles 31 and 32 associated with said switch arm 25 being electrically connected by lead 33. Pole 31 is connected by lead 34 to one side of the main winding 11 of motor M, the other side of said winding 11 being connected by lead 35 to common junction 36 which is connected by lead 37 to the other side $P_2$ of the source of alternating current.

Junction 36 is also connected by lead 38 to movable switch arm 26 of switch 15 and by lead 39 to one side of the coil 18 of relay 16. The other side of said coil 18 is connected by leads 41, 42 to movable contact 24 of relay 17 and by leads 41, 43 to pole 44 associated with movable switch arm 26 of switch 15. Pole 45 of said switch 15 also associated with movable switch arm 26, is connected by lead 46 to pole 47 of said switch 15 and by lead 48 to one side of the starting winding 12 of motor M, the other side of said starting winding 12 being connected by leads 49 and 50 to the fixed contact 21 of relay 16 and also by lead 51 to the fixed contact 22 of relay 17. The movable contact 23 of relay 16 is connected by leads 52 and 53 to pole 54 of switch 15 associated with movable switch arm 27 and by lead 55 to one side of the coil 19 of relay 17. The other side of said coil 19 is connected by leads 56 and 57 to the movable switch arm 27 and by leads 56 and 58 to one side of capacitor 14, the other side of said capacitor being connected by lead 59 to pole 32.

If desired, a running capacitor 61 may be connected by leads 62 and 63 respectively, to fixed contact 22 of relay 17 and to pole 32 of switch 15.

In the operation of the control system with the movable contact arms of switch 15 in the position shown in full lines in Fig. 1, as movable contact arm 25, which is connected by lead 29 from one side $P_1$ of the power line, is not engaging either of the poles 31 or 32 associated therewith, the circuit will be open and hence the starting and main windings will not be energized and either of the relay coils 18 and 19 will be energized.

To start the motor it is merely necessary to throw the switch so that the movable switch arms thereof are, for example, in the position shown in dot and dash lines in Fig. 1. In this position, a circuit will be completed to both the main and starting windings 11 and 12 and to the coil 18 of relay 16. This circuit is from main $P_1$ through lead 29 to movable switch arm 25 which engages pole 31, thence through lead 34, main winding 11, lead 35 to junction 36, thence by lead 37 to power line P₂. Thus, the main winding will be energized. The circuit to the starting winding is from main P₁, lead 29, movable switch arm 25 which is engaging pole 31, lead 33 to pole 32, thence through lead 59 to one side of capacitor 14 and by leads 58 and 57 to movable switch arm 27 which is engaging pole 54. Lead 53 connected to pole 54 goes by way of lead 52 to movable contact 23 of relay 16 which is normally engaging fixed contact 21, the latter being connected by leads 50 and 49 to one side of starting winding 12. The other side of the starting winding 12 is connected by lead 48 to pole 45 which is engaged by movable switch arm 26, the latter being connected by lead 38 to junction 36 which in turn is connected by lead 37 to the other side of the power main P₂.

By reason of the capacitor 14, a 90° phase displacement will be effected between the voltage applied to the main starting windings 11 and 12 thereby creating the rotating field necessary to start the rotation of rotor 13.

The coil 18 of relay 16 is connected in circuit with the starting winding 12 desirably in parallel as shown as follows: From pole 45 to which lead 48 from the starting winding 12 is connected, through movable switch arm 26, leads 38 and 39, to one side of coil 18 and from the other side of the coil through leads 41 and 42 to the movable contact 24 of relay 17 which normally engages fixed contact 22, the latter being connected by leads 51 and 49 to the other side of the starting winding 12.

It is to be noted that the coil of relay 17 will be short-circuited and hence de-energized when the coil 18 of relay 16 is in circuit, thereby to retain contacts 22, 24 in engagement to provide a closed circuit for the coil 18 of relay 16. The short circuit path for the coil 19 of relay 17 is as follows: From one side of the coil 19 of relay 17 through lead 56 to point X and from the other side of the coil 19 through leads 55 and 53 to pole 54 engaged by movable switch arm 27 and thence by lead 57 to point X.

Although coil 18 is thus connected in parallel with starting winding 12, insufficient voltage is initially developed across such coil and hence the contacts 21 and 23 associated therewith remain in engagement. As the rotor accelerates, the voltage across the starting winding 12 will increase as will the voltage across coil 18. When the voltage across coil 18 has increased to a predetermined amount which will occur when the rotor has attained nearly its synchronous speed, the coil will be energized sufficiently to attract movable contact 23 and separate the contents 21, 23 thereby breaking the circuit from the power line P₁ to the starting winding 12.

This is the condition which is desirable in single phase induction motors, for if the starting winding 12 and its associated capacitor 14 remained in circuit during the normal running of the motor, considerable current would be drawn with the resultant development of excess heat and consequent low efficiency and possible burning out of such starting winding 12. By reason of the fact that the revolving rotor 13 will induce a voltage in the adjacent starting winding 12, which voltage will be impressed across the coil 18 of relay 16 in parallel therewith and as this voltage will be sufficient to keep such coil energized, the contents 21 and 23 will remain open, thereby keeping the starting winding 12 disconnected from the power line P₁, and the motor will thereafter run on the main winding 11 in conventional manner.

When it is desired to reverse the direction of the rotation of the rotor 13 of the motor, the polarity of one of the windings must be reversed with respect to the polarity of the other winding, thereby developing a reverse torque which will cause the rotor to come to a standstill and thereupon start turning in a direction opposite to the one in which it had previously been rotating.

It is apparent that for such reverse torque to be developed both the main winding 11 and the starting winding 12 must be in circuit at the same time. However, when the motor rotor had attained its normal running speed, as previously described, the circuit of the starting winding 12 to the power main P₁ had been interrupted by the open contacts 21 and 23, which are retained in such open position during the running of the motor at normal speed, by the energization of coil 18 in parallel with the starting winding 12.

It is apparent, therefore, that in order for there to be instantaneous application of reverse torque to cause reversal of direction of rotation of the rotor 13 upon throwing switch 15, it is necessary that means be provided instantly to close the circuit to the starting winding from the main P₁ and that the polarity of the voltage applied to one of the windings be reversed. To this end it is merely necessary to move the movable switch arms of switch 15 to the right to the position shown in dashes in Fig. 1. In this position a circuit will be completed to both the main and starting windings 11 and 12 and to the coil 19 of relay 17 and the polarity of the voltage applied to the starting winding 12 with respect to the voltage applied to the main winding 11 will be reversed. This circuit will be from power line P₁ through lead 29 to movable switch arm 25 which engages pole 32, thence through lead 33 to pole 31 and from pole 31 through lead 34 to one side of main winding 11, and from the other side of main winding 11 through lead 35 to junction 36, thence by lead 37 to power line P₂. Thus, the main winding 11 will be energized. The circuit to the starting winding is from power line P₁, lead 29 to movable switch arm 25 which engages pole 32, thence by lead 59 to one side of capacitor 14 and from the other side of capacitor 14 by leads 58 and 57 to movable switch arm 27 which engages pole 47. Thence by lead 46 connected from pole 47 to pole 45 and by lead 48 to one side of starting winding 12 and thence from the other side of the starting winding 12 through leads 49 and 51 to fixed contact 22 of relay 17 which is normally engaged by movable contact 24. Thence by leads 42 and 43 to pole 44 which is engaged by movable switch arm 26 and by lead 38 from said switch arm 26 to junction 36 which is connected by lead 37 to the other side of the power line P₂.

With the circuit thus connected it is apparent that the polarity of the voltage applied to the starting winding 12 with respect to that applied to the main winding 11 has been reversed from that previously applied as heretofore described. As a result, with the movable switch arms of switch 15 in the position shown in dashes in Fig. 1, a reverse torque will be developed which will immediately slow down the motor until the rotor 13 thereof is at a standstill and thereupon by reason of the fact that a 90° phase displacement will be effected by the capacitor 14 between the voltage fed to the main and starting windings 11 and 12 respectively, the rotating field created will turn the rotor 13 in the opposite direction to that which it had been previously turning.

With the switch 15 in the position shown in dashes in Fig. 1, the coil 19 of relay 17 is connected in parallel with the starting winding 12.

The circuit is from one side of coil 19 through leads 56 and 57 to movable switch arm 27 which engages pole 47, thence by lead 46 to pole 45 which is connected by lead 48 to one side of the starting winding 12, thence from the other side of the starting winding through leads 49 and 50 to fixed contact 21 of relay 16 normally engaged by movable contact 23. Thence by leads 52 and 55 to the other side of coil 19.

It is to be noted that the coil 18 of relay 16 will be short-circuited and hence de-energized when the coil of relay 17 is in circuit to retain contacts 21, 23 in engagement to provide a closed circuit for the coil 19 of relay 17. The short-circuit path for the coil 18 of relay 16 is as follows: From one side of the coil 18 through lead 41 to the point Y, and from the other side of the coil 18 through lead 39 to junction 36, and thence by lead 38 to movable switch arm 26 which is engaging pole 44 and by lead 43 to point Y.

As the operation of the motor with the switch in the position shown in dashes in Fig. 1 is substantially the same as when the switch 15 is in the position shown in dot and dash lines in Fig. 1, it will not be described.

It is apparent from the above description that when the switch is moved to either the position shown in dot and dash lines or the position shown in dashes in Fig. 1, the starting winding 12 will immediately be put in circuit and the polarity of the voltage in the starting winding with respect to the polarity of the voltage in the main winding will also immediately be reversed.

Thus, with the circuit above described with the use of a conventional self-starting single phase induction motor and a conventional 3-pole double-throw switch and conventional relays, it is possible quickly to move the switch 15 from one position to the other immediately to develop a reverse torque on the rotor 13 that will cause reversal in the direction of rotation thereof without the need for first interrupting the circuit from the power line to the main and starting windings 11 and 12 and thereupon allowing the motor to slow down almost to a standstill before re-closing the circuit to the windings 11 and 12. As such latter procedure is time-consuming, it is not desirable for industrial application where it is essential that reversal be effected by the mere rapid throwing of a switch.

In addition, the above circuit dispenses with a need for centrifugal switches to open the circuit to the starting winding and of brakes to slow down the speed of the rotor so that it can be more quickly reversed. Such centrifugal switches and brakes are undesirable as they add materially to the bulk and cost of the system and in addition as they have many parts that are likely to wear and break down, they add greatly to the maintenance cost and idle time of the motor.

With the system above described, in the event that a sudden overload should be applied to the motor while it is running, which would slow it down or perhaps stop the motor, upon removal of such overload, one of the relays 16 or 17 as the case may be, would always be in parallel with the starting winding, and the contacts of such relay would close when the speed of rotation of the rotor 13 had decreased sufficiently to cause the voltage induced in the starting winding and hence in the coil of the associated relay to fall below a certain amount. Closure of such contacts would again close the circuit from the power line $P_1$ to the starting winding so that a rotating field would again be provided to cause the rotor of the motor to resume its normal speed.

Thus the system above described dispenses with the need for opening the power line circuit after the overload has been removed and again closing such circuit to put the main and starting windings back into the power line circuit.

Although the switch 15 has been shown as a 3-pole double-throw switch, it is of course understood that other switching arrangements could be used for the same purpose. Thus, a separate switch could be provided for the power line and a separate reversing switch could be provided, or a push button could be used to actuate a relay that operated the switch. As such switching arrangement would be obvious in view of the disclosure herein, it will not be further described.

It is also to be noted that when the switch 15 is in the intermediate position as shown in full lines in the drawings, the motor will be at a standstill with both the main and starting windings disconnected from the source of current $P_1$, $P_2$.

Although the circuit above described has been shown incorporated with a single phase induction motor adapted for use with a single given input voltage, it is a relatively simple matter to modify the main winding of the motor so that it may be used for two voltages, i. e. for 110 volts or 220 volts. To this end the circuit shown in Fig. 2 is provided.

As can be seen, this circuit is substantially identical to the circuit of Fig. 1 with substantially the only difference in the two circuits being in the construction of the main winding and the manner of connecting such main winding to the source of current. Consequently, parts shown in Fig. 2 corresponding to those shown in Fig. 1 have the same reference numerals primed.

As shown in Fig. 2, the main winding 11' is split into two separate windings 11a and 11b. One end of each of the windings are connected together by leads 66 and 67 to a common point Z which is connected by lead 67' to junction 36' and thence by lead 38' to movable switch arm 26' and by lead 39' to one side of the coil 18' of relay 16'. The free end of winding 11a is connected by lead 34' to pole 31' and the free end of winding 11b is connected by lead 37' to one side of the power line $P_2'$.

Thus, windings 11a and 11b are in series with each other which is the condition in which they must be for 220 volt input.

In order to connect the windings for 110 volt input, it is merely necessary to connect windings 11a and 11b in parallel.

To this end, as shown in Fig. 3, a switch 70 may be provided desirably having at least three contacts, 71, 72 and 73 and a movable insulating member 74 desirably carrying a pair of contact arms 75 and 76. In one position of the switch, arm 75 will be spaced from its associated contact 71 and arm 76 will engage its associated contact 72 and in the other position of the switch, arm 75 will engage contact 71 and arm 76 will engage contact 73.

The power main $P_1'$ is connected by lead 29' to movable switch arm 25' and power main $P_2'$ is connected by leads 77 and 78 to contact 73 and by leads 77 and 37' to one side of the winding 11b, the other side of said winding being connected by lead 79 to contact 71 and by lead 81 to contact 72. Arm 76 is connected by lead 83 to one side of the winding 11a and by leads 83 and 36' to movable switch arm 26', the other side of winding 11a being connected by lead 34' to pole 31' and by leads 34' and 85 to arm 75 of switch 70.

Thus, when the switch is in the position shown in Fig. 3 with arm 75 spaced from contact 71 and arm 76 engaging contact 72, windings 11a and 11b will be in series and the main winding 11 is set for an input of 220 volts and when arm 75 is engaging contact 71 and arm 76 is engaging contact 73, the windings 11a and 11b will be in parallel set for an input of 110 volts.

As many changes could be made in the above construction, and many apparently widely different embodiments of this invention could be made without departing from the scope of the claims, it is intended that all matter contained in the above description or shown in the accompanying drawings shall be interpreted as illustrative and not in a limiting sense.

Having thus described my invention, what I claim as new and desire to secure by Letters Patent of the United States is:

1. A reversing control system for a single phase induction motor of the type having a stator including a main winding and a starting winding and a rotor, said control system comprising means for connecting said windings to a source of current to effect rotation of said rotor, a pair of relays each having a coil and a pair of normally closed contacts, means to connect the coil of one of said relays in parallel with said starting winding, means to connect the contacts of said parallel connected relay in series with said starting winding, means to short-circuit the coil of the other of said relays, means to connect the contacts of said second relay in series with the coil of said first-named relay and with said starting winding, means to reverse the polarity of the current applied to one of said windings with respect to the other, said last named means including means to short-circuit the coil of said first relay and to connect its contacts in series with the coil of said second relay and with said starting windings, and means to connect the coil of said second relay in parallel with said starting winding with its contacts in series with said starting winding and the source of current.

2. A reversing control system for a single phase induction motor of the type having a stator including a main winding and a starting winding and a rotor, said control system comprising switch means for connecting said windings to a source of current to effect rotation of said rotor, means independent of said switch means for opening the circuit from such source of current to said starting winding after said rotor has exceeded a predetermined speed, said means including a first relay and a second relay each having a coil and a pair of normally closed contacts, said switch means including means for connecting the coil of said first relay in parallel with said starting winding, means for connecting the pair of contacts of said first relay in series with said starting winding, means to short-circuit the coil of said second relay, and means to connect the pair of contacts of said second relay in series with the coil of said first relay said starting winding, said switch means including means to reverse the polarity of one of said windings with respect to the other of said windings, means to short-circuit the coil of said first relay and connect its contacts in series with the coil of said second relay and with said starting winding and means to connect the coil of said second relay in parallel with said starting winding with its contacts in series with said starting winding, said relay coils when in circuit being adapted to be energized when said motor is running at substantially normal speed to open the pair of normally closed contacts associated therewith to break the circuit from the source of current to said starting winding, said coil in circuit remaining energized due to the current induced in said starting winding by said rotor.

3. The combination set forth in claim 2 in which said main winding has two sections and manually operated switch means are provided to connect said sections at will, in parallel across such source of current or in series across such source of current.

4. A reversing control system for an induction motor of the type having a main winding, a starting winding and a rotor, said control system including a pair of relays each having a coil and a pair of contacts, and switch means comprising three movable switch arms each having a pair of associated contacts, leads connecting one side of said main winding to one side of the coil of one of said relays and to the switch arm associated with one of said pairs of switch contacts, a lead connecting one of the contacts of said last named pair of switch contacts to one side of said starting winding, a phase displacement device, a lead connecting one side of said phase displacement device to one of the contacts of said second pair of switch contacts, a lead connecting the other side of said main winding to the other of the contacts of said second pair of switch contacts, a lead connecting said second named pair of switch contacts, a lead connecting the other side of said starting winding to one of the contacts of each of said relays, a lead connecting the other side of the coil of said first-named relay to the other contact of said second-named relay and to the other contact of said first-named pair of switch contacts, a lead connecting one of the contacts of said third-named pair of switch contacts to the other contact of said first-named relay and to one side of the coil of said second-named relay, a lead connecting the other contact of said third-named pair of switch contacts to the contact of said first-named pair of switch contacts to which one side of the starting winding is connected, a lead connecting the other side of said last-named coil to the movable switch arm of said third-named pair of switch contacts and to the other side of said phase displacement device, and means for connecting a source of current to the switch arm associated with said first-named pair of contacts and to the switch arm associated with said second-named pair of switch contacts.

References Cited in the file of this patent

UNITED STATES PATENTS

| Number | Name | Date |
|---|---|---|
| 2,024,726 | Ehrenfeld | Dec. 17, 1935 |
| 2,100,426 | Berger et al. | Nov. 30, 1937 |
| 2,195,287 | Schaefer | Mar. 26, 1940 |
| 2,280,888 | Buchanan | Apr. 28, 1942 |
| 2,388,382 | Brongersma | Nov. 6, 1945 |
| 2,447,675 | Walley | Aug. 24, 1948 |
| 2,473,244 | Fuller | June 14, 1949 |
| 2,509,898 | Wiseman | May 30, 1950 |
| 2,545,639 | Wolff | Mar. 20, 1951 |